(12) United States Patent  
Lin et al.

(10) Patent No.: US 10,782,814 B2  
(45) Date of Patent: Sep. 22, 2020

(54) TOUCH DISPLAY PANEL

(71) Applicant: Au Optronics Corporation, Hsinchu (TW)

(72) Inventors: Rong-Fu Lin, Hsinchu (TW); Chun-Wei Chang, Hsinchu (TW); Shu-Hao Huang, Taichung (TW); Sung-Yu Su, Tainan (TW); Jie-Chuan Huang, Hsinchu County (TW); Yun-I Liu, Hsinchu (TW)

(73) Assignee: Au Optronics Corporation, Hsinchu (TW)

( * ) Notice: Subject to any disclaimer, the term of this patent is extended or adjusted under 35 U.S.C. 154(b) by 0 days.

(21) Appl. No.: 16/297,735

(22) Filed: Mar. 11, 2019

(65) Prior Publication Data

US 2019/0286268 A1   Sep. 19, 2019

(30) Foreign Application Priority Data

Mar. 13, 2018   (TW) .............................. 107108509 A

(51) Int. Cl.
*G06F 3/041* (2006.01)
*G09G 3/20* (2006.01)

(52) U.S. Cl.
CPC .......... *G06F 3/0412* (2013.01); *G06F 3/0416* (2013.01); *G09G 3/2092* (2013.01); *G09G 2300/0452* (2013.01); *G09G 2310/0267* (2013.01); *G09G 2310/0275* (2013.01); *G09G 2310/0297* (2013.01)

(58) Field of Classification Search
CPC ...................... G09G 2310/0297; G06F 3/0412
See application file for complete search history.

(56) References Cited

U.S. PATENT DOCUMENTS

| | | | |
|---|---|---|---|
| 9,558,705 B2 | 1/2017 | Kim | |
| 9,607,559 B2 | 3/2017 | Wen et al. | |
| 2014/0152639 A1* | 6/2014 | Bang | G09G 3/3233 345/212 |

(Continued)

FOREIGN PATENT DOCUMENTS

| | | |
|---|---|---|
| CN | 108597433 | 9/2018 |
| CN | 108962116 | 12/2018 |

(Continued)

*Primary Examiner* — Kent W Chang
*Assistant Examiner* — Chayce R Bibbee
(74) *Attorney, Agent, or Firm* — JCIPRNET

(57) ABSTRACT

A touch display panel includes a pixel array, a touch module, and a multiplexer circuit. The pixel array includes a plurality of pixels, a plurality of gate lines, and a plurality of source lines. The pixels are electrically coupled to the source lines and the gate lines. The touch module and the pixel array are overlapped. The multiplexer circuit is coupled between all of the source lines and a source driver and has a plurality of multiplexers. The multiplexers are respectively coupled to n source lines and respectively include a plurality of switches and a bypass trace. The switches are respectively coupled between the first source line to the $(n-1)^{th}$ source line of the n source lines and the source drivers. The bypass trace is coupled between the $n^{th}$ source line of the n source lines and the source driver.

9 Claims, 2 Drawing Sheets

(56) References Cited

U.S. PATENT DOCUMENTS

| | | |
|---|---|---|
| 2014/0191931 A1 | 7/2014 | Kim |
| 2016/0049129 A1* | 2/2016 | Hekstra ................ G09G 3/3688 345/174 |
| 2017/0061933 A1 | 3/2017 | Jang et al. |

FOREIGN PATENT DOCUMENTS

| | | |
|---|---|---|
| TW | 201428714 | 7/2014 |
| TW | 1560670 | 12/2016 |
| TW | 201714067 | 4/2017 |

\* cited by examiner

TOUCH DISPLAY PANEL

CROSS-REFERENCE TO RELATED APPLICATION

This application claims the priority benefit of Taiwan application serial no. 107108509, filed on Mar. 13, 2018. The entirety of the above-mentioned patent application is hereby incorporated by reference herein and made a part of this specification.

TECHNICAL FIELD

The disclosure relates to a panel, and more particularly, to a touch display panel.

DESCRIPTION OF RELATED ART

At present, electronic devices have been developed toward the trend of being light, thin, short and small. In consideration of said requirements for compactness and light weight as well as costs, a shift register (SR) and a multiplexer (Mux) are integrated into a display panel. Besides, in order to provide a convenient input interface, a touch module is also integrated with the display panel. In case that the multiplexer is turned off, the data line is in a floating state, thus deteriorating stability of a common electrode. Namely, a voltage of the common electrode is prone to be interfered by external signals. Moreover, as the input/output ratio of the multiplexer increases, more control signals are required for controlling the Mux, so that the electrode in the touch module is more likely to be affected, and that the touch points cannot be accurately detected.

SUMMARY

The disclosure provides a touch display panel, wherein the number of switches in a multiplexer is reduced for reducing the required control signals and further lessening the influence of the control signals of the multiplexer on a touch module.

In an embodiment of the invention, a touch display panel includes a pixel array, a touch module, and a multiplexer circuit. The pixel array includes a plurality of pixels, a plurality of gate lines, and a plurality of source lines. The pixels are arranged in an array. The source lines are staggered with the gate lines, and the pixels are coupled to the source lines and the gate lines. The touch module and the pixel array are overlapped. The multiplexer circuit is coupled between all of the source lines and a source driver. Here, the multiplexer circuit has a plurality of multiplexer respectively coupled to n source lines and including a plurality of switches and a bypass trace. The switches are respectively coupled between the first source line to the $(n-1)^{th}$ source line of the n source lines and the source driver. The bypass trace is coupled between the $n^{th}$ source line of the n source lines and the source driver.

In view of the above, in the touch display panel of the embodiments of the invention, the bypass trace is disposed in the multiplexer circuit, and therefore fewer control signals are required. As such, the influence of the control signals of the multiplexer on the touch module may be reduced.

To make the above features and advantages provided in one or more of the embodiments of the invention more comprehensible, several embodiments accompanied with drawings are described in detail as follows.

BRIEF DESCRIPTION OF THE DRAWINGS

The accompanying drawings are included to provide a further understanding of the disclosure, and are incorporated in and constitute a part of this specification. The drawings illustrate embodiments of the disclosure and, together with the description, serve to explain the principles described herein.

DESCRIPTION OF THE EMBODIMENTS

Figure 1:
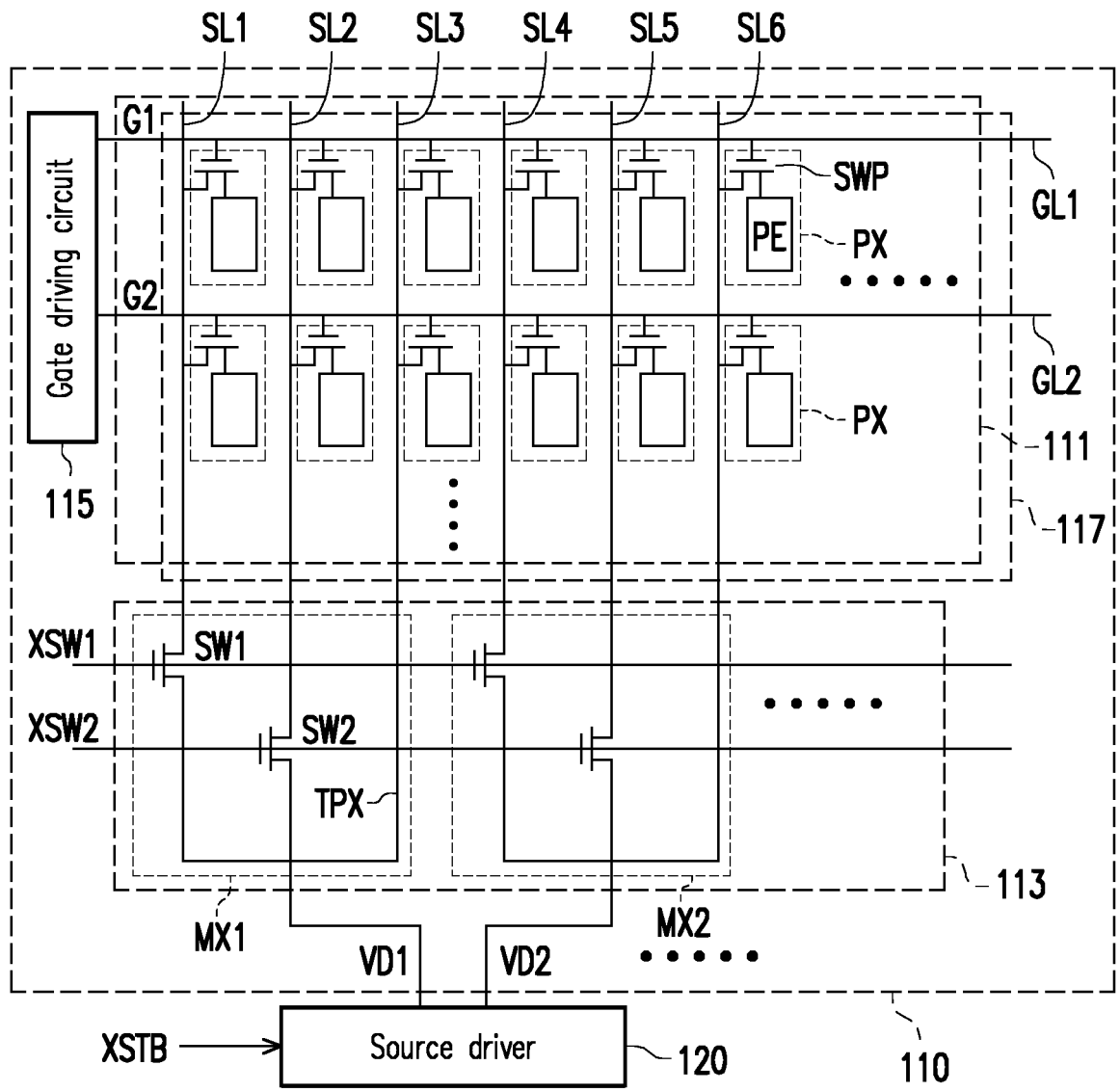
FIG. 1 is a schematic view of a system of a touch display device according to an embodiment of the invention.

FIG. 1 is a schematic view of a system of a touch display device according to an embodiment of the invention. With reference to FIG. 1, the touch display device 100 provided in the present embodiment includes a touch display panel 110 and a source driver 120, wherein the touch display panel 110 includes a pixel array 111, a multiplexer circuit 113, a gate driving circuit 115, and a touch module 117.

The pixel array 111 includes a plurality of pixels PX arranged in an array, a plurality of gate lines (e.g., GL1-GL2), and a plurality of source lines (e.g., SL1 to SL6) staggered with the gate lines (e.g., GL1-GL2). The pixels PX are disposed at the intersections of the source lines (e.g., SL1-SL6) and the gate lines (e.g., GL1-GL2), so as to be coupled to the source lines (e.g., SL1-SL6) and the gate lines (e.g., GL1-GL2). The pixels PX at least have switches SWP (i.e., transistors acting as the switches) and pixel electrodes PE. Control terminals of the switches SWP are coupled to the corresponding gate lines (e.g., GL1-GL2). One end of switch SWP is coupled to a corresponding source line (e.g., SL1-SL6), and the other end of each switch SWP is coupled to the pixel electrode PE.

The multiplexer circuit 113 is coupled between all of the source lines (e.g., SL1-SL6) and the source driver 120. That is, the multiplexer circuit 113 is disposed either above or below the pixel array 111, which may be determined by the relative positions of the source driver 120 and the touch display panel 110. Besides, the multiplexer circuit 113 has a plurality of multiplexer (e.g., MX1-MX2), and each of the multiplexer (e.g., MX1-MX2) is respectively coupled to n source lines (in this case, n is 3, for instance). In other words, the multiplexer MX1 is coupled to the source lines SL1-SL3, and the multiplexer MX2 is coupled to the source lines SL4-SL6. Each multiplexer (e.g., MX1-MX2) includes switches SW1-SW2 (i.e., transistors acting as the switches) and a bypass trace TPX, wherein the switches SW1-SW2 receive control signals XSW1-XSW2, respectively. The switch SW1 is coupled between the source line SL1 and the source driver 120. The switch SW2 is coupled between the source line SL2 and the source driver 120. The bypass trace TPX is coupled between the source line SL3 and the source driver 120.

The gate driving circuit 115 is coupled to all of the gate lines (e.g., GL1-GL2) to sequentially provide a plurality of enabled signals (e.g., G1-G2), and the gate driving circuit 115 may be disposed on the right-hand side or the left-hand side of the pixel array 111. Here, the gate driving circuit 115 is disposed on the left-hand side of the pixel array 111, for instance. The touch module 117 and the pixel array 111 are overlapped. The source driver 120 is coupled to each multiplexer (e.g., MX1-MX2) of the multiplexer circuit 113 and receives a voltage output signal XSTB, so as to provide a plurality of data voltages (e.g., VD1-VD2) to each multiplexer (e.g., MX1-MX2) according to the voltage output signal XSTB.

In this embodiment, each multiplexer (e.g., MX1 -MX2) is respectively coupled to three of the source lines (e.g., SL1-SL6), i.e., n is equal to 3. The three source lines (e.g., SL1-SL6) respectively correspond to red, blue, and green. For instance, the source line SL1 corresponds to red, the source line SL2 corresponds to blue, and the source line SL3 corresponds to green. That is, the source line SL1 is coupled to the red pixel PX, the source line SL2 is coupled to the blue pixel PX, and the source line SL3 is coupled to the green pixel PX. The above is an example provided for explanation, and the example should not be construed as a limitation in the disclosure.

In an embodiment of the invention, each multiplexer (e.g., MX1-MX2) is coupled to n source lines (e.g., SL1-SL6); the switches (e.g.,SW1-SW2) of each of the multiplexer (e.g., MX1-MX2) is respectively coupled between the first source line to the $(n-1)^{th}$ source line of the n source lines (e.g., SL1 to SL6) and the source driver 120; the bypass trace TPX in each multiplexer (e.g., MX1-MX2) is coupled between the $n^{th}$ source line of the n source lines (e.g., SL1 to SL6) and the source driver 120. Thereby, the multiplexer circuit 113 merely requires $(n-1)^{th}$ control signals, so as to lessen the impact of the control signals (e.g., XSW1-XSW2) of the multiplexer (e.g., MX1-MX2) on the touch module 117.

In the present embodiment, one gate driving circuit 115 is illustrated; in other embodiments, the gate driving circuit (e.g., 115) may be simultaneously disposed on the right-hand side and the left-hand side of the pixel array 111 in the touch display panel 110. Besides, two gate driving circuits (e.g., 115) on the touch display panel 110 may synchronously drive or alternately drive all of the gate lines (e.g., GL1-GL2). In other words, the two gate driving circuits (e.g., 115) may simultaneously output a plurality of sequentially enabled scan signals (e.g., G1-G2), or two gate driving circuits (e.g., 115) may alternately output a plurality of sequentially enabled scan signals (e.g., G1-G2).

Figure 2:
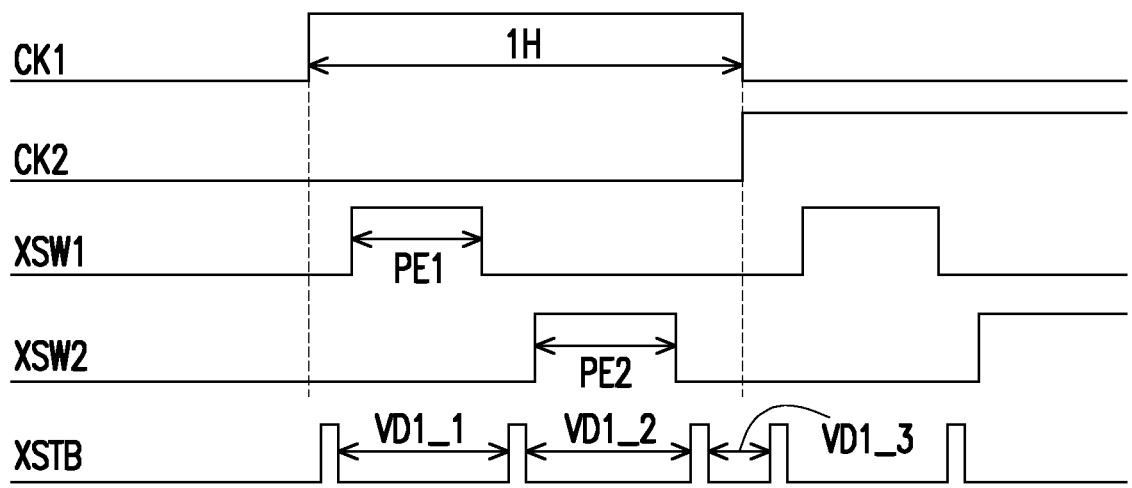
FIG. 2 schematically illustrates a driving waveform of a touch display panel according to an embodiment of the invention.

FIG. 2 schematically illustrates a driving waveform of a touch display panel according to an embodiment of the invention. With reference to FIG. 1 and FIG. 2, n is equal 3, for instance. During a horizontal scan period (shown as 1H), the control signals XSW1-XSW2 of the switches SW1-SW2 are sequentially enabled; that is, the switches SW1-SW2 are sequentially turned on, as shown in the enabling periods PE1-PE2. The enabling periods PE1-PE2 are set to be the same; namely, the turn-on time periods of the switches SW1-SW2 are set to be the same. Correspondingly, the time periods of providing the source lines SL1-SL2 with the data voltages VD1_1-VD1_2 are set to be the same.

Since the source line SL3 receives the data voltage VD1_3 not via any switch (e.g., SW1-SW2), the charging efficiency of the source line SL3 is much higher than that of the source lines SL1-SL2. Correspondingly, the time period of providing the source line SL3 with the data voltage VD1_3 may be shorter; that is, the time periods the source lines SL1-SL2 with the data voltages VD1_1-VD1_2 are much longer than the time period of providing the source line SL3 with the data voltage VD1_3.

On the other hand, since the data voltages VD1_1-VD1_2 are transmitted via the switches SW1-SW2, the time periods of writing the data voltages VD1_1-VD1_2 into the pixels PX are respectively determined by enabling periods PE1 and PE2 of the corresponding switches SW1-SW2. However, since the data voltage VD1_3 is not transmitted via any switch (e.g., SW1-SW2), the time period of writing the data voltage VD1_3 into the pixel PX is determined by the corresponding scan signals (e.g., G1-G2).

In the embodiment, although each multiplexer (e.g., MX1-MX2) is respectively coupled to three source lines (e.g., SL1-SL6), the enabling periods PE1-PE2 of two switches SW1-SW2 are configured in one horizontal scan period 1H, and therefore the enabling periods PE1-PE2 may be relatively long. According to an embodiment, the touch module may perform a scan action during at least one of the enabling periods PE1-PE2, so as to reduce the likelihood that the touch module 117 is interfered by noise.

In the present embodiment, the data voltages VD1_1-VD1_2 are transmitted via the switches SW1-SW2, and the data voltage VD1_3 is transmitted via the bypass trace TPX. That is, the charging periods of the data voltages VD1_1-VD1_2 are determined by the turn-on time periods of the switches SW1-SW2, so that the charging efficiency of the data voltage VD1_3 is greater than that of the data voltages VD1_1-VD1_2. Optically, if the data voltage VD1_3 is applied to charge the pixels PX that display green, i.e., the pixels PX on the $n^{th}$ source line (e.g., SL1 to SL6) to which each multiplexer (e.g., MX1-MX2) is coupled is configured to display green, the transmittance of the pixels PX may be improved. Alternatively, if the data voltage VD1_3 is applied to charge the pixels PX that display blue, i.e., the pixels PX on the $n^{th}$ source line (e.g., SL1 to SL6) to which each multiplexer (e.g., MX1-MX2) is coupled is configured to display blue, the overall brightness of the touch display device 100 may be improved with a backlight module (not shown).

To sum up, in the touch display panel of the embodiments of the invention, fewer control signals are required by the multiplexer circuit, and accordingly the influence of the control signals of the multiplexer on the touch module may be reduced. Besides, the pixels on the $n^{th}$ source line to which each multiplexer is coupled may be applied to display green, so as to improve the transmittance of the pixels. Alternatively, the pixels on the $n^{th}$ source line to which each multiplexer is coupled may be applied to display blue, so that the overall brightness of the touch display device may be improved with a backlight.

It will be apparent to those skilled in the art that various modifications and variations can be made to the structure of the disclosure without departing from the scope or spirit of the disclosure. In view of the foregoing, it is intended that the disclosure cover modifications and variations provided they fall within the scope of the following claims and their equivalents.

What is claimed is:

1. A touch display panel comprising:
    a pixel array comprising:
        a plurality of pixels arranged in an array;
        a plurality of gate lines; and
        a plurality of source lines staggered with the plurality of gate lines, the plurality of pixels being coupled to the plurality of source lines and the plurality of gate lines;
    a touch module, the touch module and the pixel array are overlapped; and
    a multiplexer circuit coupled between all of the plurality of source lines and a source driver, the multiplexer circuit having a plurality of multiplexers, the plurality of multiplexers being respectively coupled to n source lines of the plurality of source lines and comprising:
        a plurality of switches respectively coupled between a first source line to an $(n-1)^{th}$ source line of the n source lines and the source driver; and a bypass trace coupled between an $n^{th}$ source line of the n source lines and the source driver, wherein time periods of providing data voltages of the first source line to the $(n-1)^{th}$ source line are longer than a time period of providing a data voltage of the $n^{th}$ source line.

2. The display panel according to claim 1, wherein the time periods of providing the data voltages of the first source line to the $(n-1)^{th}$ source line are equal.

3. The touch display panel according to claim 2, wherein time periods of writing the data voltages of the first source line to the (n-1) source line are respectively determined by turn-on time periods of corresponding switches of the plurality of switches.

4. The touch display panel according to claim 2, wherein a scan action of the touch module is executed at at least one of the turn-on time periods of the plurality of switches.

5. The touch display panel according to claim 2, further comprising a gate driving circuit coupled to all of the plurality of gate lines to sequentially provide a plurality of enabled scan signals.

6. The touch display panel according to claim 5, wherein a time period of writing the data voltage of the $n^{th}$ source line is determined by a corresponding scan signal of the plurality of scanned signals.

7. The touch display panel according to claim 1, when n is equal to 3, the plurality of pixels of the n source lines respectively displaying red, blue, and green.

8. The touch display panel according to claim 7, the plurality of pixels of the n source line being configured to display green.

9. The touch display panel according to claim 7, the plurality of pixels of the $n^{th}$ source line being configured to display blue.

* * * * *